United States Patent
Liu et al.

(10) Patent No.: US 10,846,696 B2
(45) Date of Patent: Nov. 24, 2020

(54) APPARATUS AND METHOD FOR TRUSTED EXECUTION ENVIRONMENT BASED SECURE PAYMENT TRANSACTIONS

(71) Applicant: Samsung Electronics Co., Ltd., Suwon-si (KR)

(72) Inventors: An Liu, Mountain View, CA (US); Shyam Prasad, Mountain View, CA (US); Abdul Syed Ebrahim, Mountain View, CA (US); Pai Peng, Mountain View, CA (US); Balakrishna Venkataraman, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 557 days.

(21) Appl. No.: 15/156,871

(22) Filed: May 17, 2016

(65) Prior Publication Data
US 2017/0061436 A1   Mar. 2, 2017

Related U.S. Application Data

(60) Provisional application No. 62/209,125, filed on Aug. 24, 2015.

(51) Int. Cl.
*G06Q 20/40* (2012.01)
*G06F 21/74* (2013.01)
(Continued)

(52) U.S. Cl.
CPC ....... *G06Q 20/4014* (2013.01); *G06F 21/575* (2013.01); *G06F 21/6245* (2013.01);
(Continued)

(58) Field of Classification Search
CPC .............. G06Q 20/4014; G06Q 20/32; G06Q 20/3227; G06Q 20/382; H04W 4/60;
(Continued)

(56) References Cited

U.S. PATENT DOCUMENTS

| 5,784,463 A | 7/1998 | Chen et al. |
| 6,357,006 B1 | 3/2002 | Pham et al. |

(Continued)

FOREIGN PATENT DOCUMENTS

| EP | 1176844 A3 | 1/2002 |
| EP | 2856407 A1 | 11/2013 |

(Continued)

OTHER PUBLICATIONS

N. Asokan, J.E. Ekberg, K. Kostiainen, A. Rajan, C. Rozas, A.R. Sadeghi, S. Schulz, and C. Wachsmann, "Mobile Trusted Computing," Proceedings of the IEEE, vol. 102, No. 8, pp. 1189-1206, Aug. 2014.*

(Continued)

*Primary Examiner* — James D Nigh (57) ABSTRACT

An apparatus and method for providing a secure payment transaction on a mobile device are provided. The method includes determining, using a computer processor of the mobile device, whether a requested operation is a security sensitive operation, and when the requested operation is determined to be a security sensitive operation, executing the requested operation in a secure environment of the mobile device.

23 Claims, 6 Drawing Sheets

(51) Int. Cl.
*G06Q 20/32* (2012.01)
*G06Q 20/38* (2012.01)
*H04W 4/60* (2018.01)
*G06F 21/57* (2013.01)
*G06F 21/62* (2013.01)
*H04M 1/725* (2006.01)
*H04W 12/06* (2009.01)

(52) U.S. Cl.
CPC ............ *G06F 21/74* (2013.01); *G06Q 20/32* (2013.01); *G06Q 20/3227* (2013.01); *G06Q 20/382* (2013.01); *H04M 1/72522* (2013.01); *H04W 4/60* (2018.02); *H04W 12/06* (2013.01)

(58) Field of Classification Search
CPC .. H04W 12/06; G06F 21/575; G06F 21/6245; G06F 21/74; H04M 1/72522
USPC .......................................................... 705/65
See application file for complete search history.

(56) References Cited

U.S. PATENT DOCUMENTS

| | | | |
|---|---|---|---|
| 7,767,430 B2 | 8/2010 | Neeser et al. | |
| 8,302,201 B1 | 10/2012 | Gupta et al. | |
| 8,375,220 B2 | 2/2013 | Prakash et al. | |
| 8,489,067 B2 | 7/2013 | Rackley, III et al. | |
| 8,533,803 B2* | 9/2013 | Cha | G06F 21/34 726/7 |
| 8,655,310 B1* | 2/2014 | Katzer | H04M 1/72519 455/410 |
| 8,744,914 B2 | 6/2014 | Mon et al. | |
| 8,966,268 B2 | 2/2015 | Marien | |
| 8,977,567 B2 | 3/2015 | Aabye et al. | |
| 9,008,618 B1 | 4/2015 | Fox | |
| 9,022,285 B2 | 5/2015 | Graylin | |
| 9,055,314 B2 | 6/2015 | Yin et al. | |
| 9,070,122 B1 | 6/2015 | Geller et al. | |
| 9,112,703 B2 | 8/2015 | Wood et al. | |
| 9,118,464 B2 | 8/2015 | Nix | |
| 9,123,036 B2 | 9/2015 | Graylin et al. | |
| 9,129,199 B2 | 9/2015 | Spodak et al. | |
| 9,130,910 B1 | 9/2015 | Logue | |
| 9,135,424 B2 | 9/2015 | Taveau et al. | |
| 9,137,025 B2 | 9/2015 | Lambert | |
| 9,161,196 B2 | 10/2015 | Ballantyne et al. | |
| 9,161,225 B2 | 10/2015 | Pecen et al. | |
| 9,166,953 B2 | 10/2015 | Luukkala et al. | |
| 9,167,428 B2 | 10/2015 | Buntinx | |
| 2003/0217165 A1 | 11/2003 | Buch et al. | |
| 2004/0098352 A1 | 5/2004 | Matsuyama | |
| 2007/0204153 A1 | 8/2007 | Tome et al. | |
| 2008/0320566 A1 | 12/2008 | Herzog et al. | |
| 2010/0138912 A1 | 6/2010 | Bauchot et al. | |
| 2011/0022835 A1 | 1/2011 | Schibuk | |
| 2011/0099112 A1 | 4/2011 | Mages et al. | |
| 2011/0106674 A1 | 5/2011 | Perlman | |
| 2011/0191244 A1 | 8/2011 | Dai | |
| 2011/0239304 A1 | 9/2011 | Saarisalo | |
| 2011/0246315 A1 | 10/2011 | Spies et al. | |
| 2011/0289006 A1 | 11/2011 | Hutchison et al. | |
| 2011/0314538 A1* | 12/2011 | Huang | G06F 21/62 726/19 |
| 2011/0320314 A1 | 12/2011 | Brown | |
| 2011/0320345 A1 | 12/2011 | Taveau et al. | |
| 2012/0101951 A1 | 4/2012 | Li et al. | |
| 2012/0150742 A1 | 6/2012 | Poon et al. | |
| 2012/0221467 A1 | 8/2012 | Hamzeh et al. | |
| 2012/0330843 A1 | 12/2012 | Von Mueller et al. | |
| 2013/0007114 A1 | 1/2013 | Wee et al. | |
| 2013/0031374 A1* | 1/2013 | Thom | G06F 21/57 713/189 |
| 2013/0124420 A1 | 5/2013 | Duri et al. | |
| 2013/0168450 A1 | 7/2013 | Von Mueller et al. | |
| 2013/0305392 A1* | 11/2013 | Bar-El | H04L 9/08 726/29 |
| 2013/0347064 A1 | 12/2013 | Aissi | |
| 2014/0013406 A1 | 1/2014 | Tremlet | |
| 2014/0096226 A1* | 4/2014 | Barkan | G06F 21/57 726/11 |
| 2014/0101679 A1 | 4/2014 | Yin et al. | |
| 2014/0122873 A1 | 5/2014 | Deutsch et al. | |
| 2014/0150104 A1* | 5/2014 | Bousquet | G06F 21/55 726/23 |
| 2014/0156534 A1 | 6/2014 | Quigley et al. | |
| 2014/0172597 A1 | 6/2014 | Spies et al. | |
| 2014/0180931 A1 | 6/2014 | Lie et al. | |
| 2014/0246490 A1 | 9/2014 | Graylin | |
| 2014/0249948 A1 | 9/2014 | Graylin et al. | |
| 2014/0289130 A1 | 9/2014 | Savolainen et al. | |
| 2014/0317686 A1* | 10/2014 | Vetillard | G06F 21/74 726/2 |
| 2014/0344155 A1 | 11/2014 | Liu et al. | |
| 2014/0358794 A1 | 12/2014 | Finley | |
| 2015/0006392 A1 | 1/2015 | Brand et al. | |
| 2015/0006404 A1 | 1/2015 | Beidl et al. | |
| 2015/0072726 A1 | 3/2015 | Stern | |
| 2015/0081554 A1 | 3/2015 | Wong et al. | |
| 2015/0082025 A1 | 3/2015 | Deshpande | |
| 2015/0100788 A1 | 4/2015 | Chastain et al. | |
| 2015/0229477 A1 | 8/2015 | Blair et al. | |
| 2015/0235204 A1 | 8/2015 | Wallner | |
| 2015/0235290 A1 | 8/2015 | Boemi et al. | |
| 2015/0269582 A1* | 9/2015 | Simmons | G06Q 20/202 705/21 |
| 2015/0287029 A1 | 10/2015 | Park et al. | |
| 2015/0302201 A1* | 10/2015 | Ryu | G06Q 20/382 726/22 |
| 2015/0348026 A1 | 12/2015 | Roberts et al. | |
| 2015/0381369 A1 | 12/2015 | Broumas et al. | |
| 2016/0036892 A1 | 2/2016 | Twitchell, Jr. | |
| 2016/0080468 A1 | 3/2016 | Lambert et al. | |
| 2016/0092876 A1 | 3/2016 | Kamal et al. | |
| 2016/0162893 A1 | 6/2016 | Kamal et al. | |
| 2016/0253651 A1 | 9/2016 | Park et al. | |
| 2016/0253652 A1 | 9/2016 | Je et al. | |
| 2017/0236125 A1* | 8/2017 | Guise | G06Q 20/20 705/17 |

FOREIGN PATENT DOCUMENTS

| | | | |
|---|---|---|---|
| KR | 10-064-6350 B1 | 11/2006 | |
| WO | 2006/035421 A2 | 4/2006 | |
| WO | 2012/068094 A1 | 5/2012 | |
| WO | 2014/081073 A1 | 5/2014 | |
| WO | 2014/149498 A2 | 9/2014 | |
| WO | 2015/023504 A1 | 2/2015 | |
| WO | 2015/126753 A1 | 8/2015 | |
| WO | WO-2016001867 A2 * | 1/2016 | G06Q 20/29 |

OTHER PUBLICATIONS

T.Feng, N.DeSalvo, L. Xu, X. Wang, and W. Shi, "Secure Session on Mobile: and Exploration on Combining Biometric, TrustZone, and User Behavior", [2014 6th International Conference on Mobile Computing, Applications and Services (MobiCASE). Proceedings: 249. IEEE. (conference Nov. 2014)].*

H. Löhr, A. Sadeghi and M. Winandy, "Patterns for Secure Boot and Secure Storage in Computer Systems," 2010 International Conference on Availability, Reliability and Security, Krakow, 2010, pp. 569-573. doi: 10.1109/ARES.2010.110.*

Samsung, "Android security maintained by Samsung KNOX Safeguard enterprise mobility with tightly integrated security, compliance and control features", 11 pages, Sep. 28, 2015 (Year: 2015).*

Sims, "ARM's built-in security and how it might just get rid of the password", 11 pages, Oct. 15, 2014 (Year: 2014).*

Samsung KNOX, "In-Depth Look at Capabilities: Samsung KNOX and Android for Work", 6 pages, Apr. 10, 2015 (Year: 2015).*

(56) References Cited

OTHER PUBLICATIONS

Screen grab of https://www.samsungknox.com/en/products/know-workspace from the Internet Archive, crawled on Mar. 25, 2015, 6 pages (Year: 2015).*
Mobile Software Security Research, iOS Device Protection Review—1. TrustZone, retrieved from cipherbox.blogspot.com/2015/05/ios-device-protection-review-trustzone.html, 9 pages, May 15, 2015 (Year: 2015).*
Screen grab of https://www.samsung.com/us/samsung-pay/ from the Internet Archive for Aug. 15, 2015, 12 pages (Year: 2015).*
Screen grab of https://www.samsung.com/us/samsung-pay/ from the Internet Archive for Oct. 1, 2015, 6 pages (Year: 2015).*
Samsung Knox White Paper: An Overview of the Samsung KNOXTM 2.0 Platform, Jun. 2014, 18 pages (Year: 2014).*
Screen grab of https://www.samsungknox.com/en/support from the Internet Archive crawled on Mar. 26, 2015, 4 pages (Year: 2015).*
Screen grab of "Updating you Samsung Galaxy device to be compatible with Samsung Pay", 4 pages, from 2015 (Year: 2015).*
N. Asokan, J.E. Ekberg, K Kostiainen, A. Rajan, C. Rozas, A.R. Sadeghi, S. Schulz, and C. Wachsmann, "Mobile Trusted Computing", Proceedings of the IEEE, vol. 102, No. 8, pp. 1189-1206, Aug. 2014 (Year: 2014).*
T. Feng, N.DeSalvo, L. Xu, X. Wang, and W. Shi, "Secure Session on Mobile: and Exploration on Combining Biometric, TrustZone, and User Behavior", [2014 6th International Conference on Mobile Computing, Applications and Services (MobiCASE). Proceedings: 249. IEEE. (conference Nov. 2014) (Year: 2014).*
About Apple Pay in the US, Apple Support, Oct. 22, 2015.
George Wallner, A LoopPay White Paper, Storage Security and Mobile Payments—Dramatically Faster and Cheaper to Implement, 2014.
Reddy et al., "A Practical Approach for Implementation of Public Key Infrastructure for Digital Signatures", Journal of Information Engineering and Applications, vol. 1, No. 2, 2011.
Ibrahim, "Receiver-deniable Public-Key Encryption", International Journal of Network Security, vol. 8, No. 2, pp. 159-165, Mar. 2009.
Communication pursuant to Article 94(3) EPC dated Oct. 9, 2019 in connection with European Patent Application No. 16 839 601.8, 8 pages.
Communication pursuant to Article 94(3) EPC dated Oct. 9, 2019 in connection with European Patent Application No. 16 839 570.5, 6 pages.
USPTO Notice of Allowance regarding U.S. Appl. No. 15/221,030, dated Feb. 20, 2020, 10 pages.
U.S. Final Office Action dated Mar. 22, 2019, issued in U.S. Appl. No. 15/221,030.
European Office Action dated Mar. 27, 2019, issued in European Patent Application No. 16755954.1-1213.

* cited by examiner

APPARATUS AND METHOD FOR TRUSTED EXECUTION ENVIRONMENT BASED SECURE PAYMENT TRANSACTIONS

CROSS-REFERENCE TO RELATED APPLICATION(S)

This application claims the benefit under 35 U.S.C. § 119(e) of a U.S. Provisional application filed on Aug. 24, 2015 in the U.S. Patent and Trademark Office and assigned Ser. No. 62/209,125, the entire disclosure of which is hereby incorporated by reference.

TECHNICAL FIELD

The present disclosure relates to an apparatus and method for securing sensitive data on a mobile device. More particularly, the present disclosure relates to an apparatus and method for secure payment transactions using a trusted execution environment.

BACKGROUND

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MIMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

A number of applications on a mobile terminal may contain, receive, or generate sensitive data. Mobile terminals may also download applications (e.g., either legitimate or unintentional malware) which should have user-controlled access to data stored on the mobile terminal. Mobile terminals are easily lost or stolen. A user may also trade-in a mobile terminal without erasing data.

Accordingly, there is a need for an apparatus and method for securing sensitive data, including those used for payment transactions, on a mobile terminal.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for securing sensitive data on a mobile device.

An apparatus and method for providing a secure payment transaction on a mobile device are provided. The method includes determining, using a computer processor of the mobile device, whether a requested operation is a security sensitive operation, and when the requested operation is determined to be a security sensitive operation, executing the requested operation in a secure environment of the mobile device.

In accordance with another aspect of the present disclosure, an apparatus for securing sensitive data on a mobile device is provided. The apparatus may include a memory in a secure environment on the mobile device, the memory storing executable instructions for securing sensitive data. The apparatus may further include a touch sensitive display for displaying a trusted user interface (TUI) on the mobile device and a processor in the secure environment on the mobile device. The processor may be configured to execute the stored instructions to determine whether a requested operation is a security sensitive operation, and when the requested operation is determined to be a security sensitive operation, execute the requested operation in a secure environment of the mobile device.

In accordance with yet another aspect of the present disclosure, an article of manufacture for securing sensitive data on a mobile device is provided. The article of manufacture may include at least one non-transitory computer processor readable storage medium and instructions stored on the at least one non-transitory computer processor readable storage medium, wherein the instructions are configured to be readable from the at least one non-transitory computer processor readable storage medium by at least one computer processor. The instructions may thereby cause the at least one computer processor to perform a method including determining whether a requested operation is a security sensitive operation, and when the requested operation is determined to be a security sensitive operation, executing the requested operation in a secure environment of the mobile device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Detailed descriptions of various aspects of the present disclosure will be discussed below with reference to the attached drawings. The descriptions are set forth as examples only, and shall not limit the scope of the present disclosure.

The detailed description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic Appcessory® (e.g., a physical device and counterpart application for a mobile device, such as a toy or fitness product associated with a mobile device application), an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Various embodiments of the present disclosure include an apparatus and method for adding security to a mobile telephone.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

Figure 1:
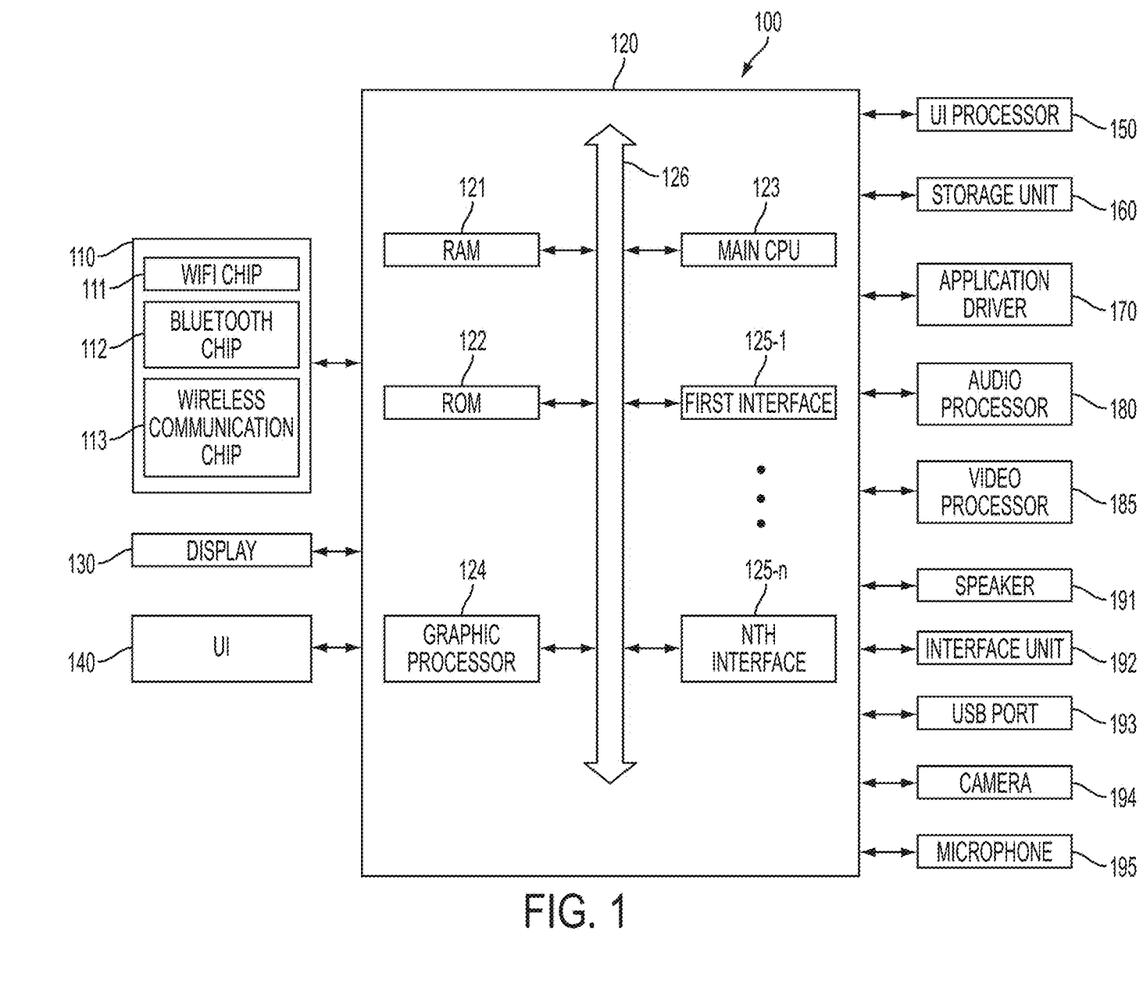
FIG. 1 illustrates a block diagram of the terminal device according to various embodiments of the present disclosure.

FIG. 1 illustrates a block diagram of the terminal device according to various embodiments of the present disclosure.

Referring to FIG. 1, the user terminal device 100 includes a communication device 110, the controller 120, the display 130, a user interface (UI) 140, a UI processor 150, a storage unit 160, an application driver 170, an audio processor 180, a video processor 185, a speaker 191, an interface unit 192, a USB port 193, a camera 194, and a microphone 195.

The communication device 110 performs communication functions with various types of external apparatuses. The communication device 110 may include various communication chips such as a Wireless Fidelity (WiFi) chip 111, a Bluetooth® chip 112, a wireless communication chip 113, and so forth. The WiFi chip 111 and the Bluetooth® chip 112 perform communication according to a WiFi standard and a Bluetooth® standard, respectively. The wireless communication 113 chip performs communication according to various communication standards such as Zigbee®, 3rd Generation (3G), 3rd Generation Partnership Project (3GPP), Long Term Evolution (LTE), and so forth. In addition, the communication device 110 may further include an Near Field Communication (NFC) chip that operates according to a NFC method by using bandwidth from various RF-ID frequency bands such as 135 kHz, 13.56 MHz, 433 MHz, 860~960 MHz, 2.45 GHz, and so on.

The operation of the controller 120 reads a computer readable medium and performs instructions according to the computer readable medium, which is stored in the storage unit 160. The storage unit 160 may also store various data such as Operating System (O/S) software, applications, multimedia content (e.g., video files, music files, etc.), user data (documents, settings, etc.), and so forth.

Other software modules which are stored in the storage unit 160 will be described later with reference to FIG. 1.

The UI 140 is an input device configured to receive user input and transmit a user command corresponding to the user input to the controller 120. For example, the UI 140 may be implemented by any suitable input such as touch pad, a key pad including various function keys, number keys, special keys, text keys, or a touch screen, for example. In some embodiments, UI 140 may be a trusted user interface (TUI) implemented as part of or securely integrated with a secure environment (e.g., a trusted execution environment). Accordingly, the UI 140 receives various user commands. For example, the UI 140 may receive a user command for file access or inputting data used for generation of a key.

The UI processor 150 may process and generate various UI screens in 2D or 3D form. Herein, the UI screen may be a screen which is associated with the execution of the integrated wish-list application as described above. In addition, the UI screen may be a screen which displays text or diagrams such as a menu screen, a warning sentence, a time, a channel number, etc.

Further, the UI processor 150 may perform operations such as 2D/3D conversion of UI elements, adjustment of transparency, color, size, shape, and location, highlights, animation effects, and so on.

The storage unit 160 is a storage medium that stores various computer readable mediums that are configured to operate the user terminal device 100, and may be realized as any suitable storage device such as a Hard Disk Drive (HDD), a flash memory module, and so forth. For example, the storage unit 160 may comprise a Read Only Memory (ROM) for storing programs to perform operations of the controller 120, a Random Access Memory (RAM) 121 for temporarily storing data of the controller 120, and so forth. In addition, the storage unit 160 may further comprise Electrically Erasable and Programmable ROM (EEPROM) for storing various reference data.

The application driver 170 executes applications that may be provided by the user terminal device 100. Such applications are executable and perform user desired functions such as playback of multimedia content, messaging functions, communication functions, display of data retrieved from a network, and so forth.

The audio processor 180 is configured to process audio data for input and output of the user terminal device 100. For example, the audio processor 180 may decode data for playback, filter audio data for playback, encode data for transmission, and so forth.

The video processor 185 is configured to process video data for input and output of the user terminal device 100. For example, the video processor 185 may decode video data for playback, scale video data for presentation, filter noise, convert frame rates and/or resolution, encode video data input, and so forth.

The speaker 191 is provided to output audio data processed by the audio processor 180 such as alarm sounds, voice messages, audio content from multimedia, audio content from digital files, and audio provided from applications, and so forth.

The interface unit 192 may be configured based on the user terminal device 100 and include any suitable input mechanism such as a mechanical button, a touch pad, a wheel, and so forth. The interface unit 192 is generally on a particular position of the user terminal device 100, such as on the front, side, or rear of the external surface of the main body. For example, a button to turn the user terminal device 100 on and off may be provided on a side.

The USB port 193 may perform communication with various external apparatuses through a USB cable or perform recharging. In other examples, suitable ports may be included to connect to external devices such as an 802.11 Ethernet port, a proprietary connector, or any suitable connector associated with a standard to exchange information.

The camera 194 may be configured to capture (i.e., photograph) an image as a photograph or as a video file (i.e., movie). The camera 194 may include any suitable number of cameras in any suitable location. For example, the user terminal device 100 may include a front camera and rear camera.

The microphone 195 receives a user voice or other sounds and converts the same to audio data. The controller 120 may use a user voice input through the microphone 195 during an audio or a video call, or may convert the user voice into audio data and store the same in the storage unit 160.

When the camera 194 and the microphone 195 are provided, the controller 120 may receive based on a speech input into the microphone 195 or a user motion recognized by the camera 194. Accordingly, the user terminal device 100 may operate in a motion control mode or a voice control mode. When the user terminal device 100 operates in the motion control mode, the controller 120 captures images of a user by activating the camera 194, determines if a particular user motion is input, and performs an operation according to the input user motion. When the user terminal device 100 operates in the voice control mode, the controller 120 analyzes the audio input through the microphone and performs a control operation according to the analyzed audio.

In addition, various external input ports are provided to connect to various external terminals such as a headset, a mouse, a Local Area Network (LAN), etc., may be further included.

Generally, the controller 120 controls overall operations of the user terminal device 100 using computer readable mediums that are stored in the storage unit 160.

For example, the controller 120 may initiate an application stored in the storage unit 160, and execute the application by displaying a UI to interact with the application. In other examples, the controller 120 may playback media content stored in the storage unit 160 and may communicate with external apparatuses through the communication device 110.

Specifically, the controller 120 comprises a RAM 121, a ROM 122, a main CPU 123, a graphic processor 124, a first to nth interfaces 125-1~125-n, and a bus 126. In some examples, the components of the controller 120 may be integral in a single packaged integrated circuit. In other examples, the components may be implemented in discrete devices (e.g., the graphic processor 124 may be a separate device).

The RAM 121, the ROM 122, the main CPU 123, the graphic processor 124, and the first to nth interfaces 125-1~125-n may be connected to each other through a bus 126.

The first to nth interfaces 125-1~125-n are connected to the above-described various components. One of the interfaces may be a network interface which is connected to an external apparatus via the network.

The main CPU 123 accesses the storage unit 160 and to initiate a booting process to execute the O/S stored in the storage unit 160. After booting the O/S, the main CPU 123 is configured to perform operations according to software modules, contents, and data stored in the storage unit 160.

The ROM 122 stores a set of commands for system booting. If a turn-on command is input and power is supplied, the main CPU 123 copies an O/S stored in the storage unit 160 onto the RAM 121 and boots a system to execute the O/S. Once the booting is completed, the main CPU 123 may copy application programs in the storage unit X60 onto the RAM X21 and execute the application programs.

The graphic processor 124 is configured to generate a screen including objects such as, for example an icon, an image, and text using a computing unit (not shown) and a rendering unit (not shown). The computing unit computes property values such as coordinates, shape, size, and color of each object to be displayed according to the layout of the screen using input from the user. The rendering unit generates a screen with various layouts including objects based on the property values computed by the computing unit. The screen generated by the rendering unit is displayed by the display 130.

Albeit not illustrated in the drawing, the user terminal device 100 may further comprise a sensor (not shown) configured to sense various manipulations such as touch, rotation, tilt, pressure, approach, etc. with respect to the user terminal device 100. In particular, the sensor (not shown) may include a touch sensor that senses a touch that may be realized as a capacitive or resistive sensor. The capacitive sensor calculates a touch coordinates by sensing micro-electricity provided when the user touches the surface of the display 130, which includes a dielectric coated on the surface of the display 130. The resistive sensor comprises two electrode plates that contact each other when a user touches the screen, thereby allowing electric current to flow to calculate the touch coordinates. As such, a touch sensor may be realized in various forms. In addition, the sensor may further include additional sensors such as an orientation sensor to sense a rotation of the user terminal device 100 and an acceleration sensor to sense displacement of the user terminal device 100.

FIG. 1 illustrates an example of specific elements included in the terminal device 100. However, components the terminal device 100 may be added, omitted, or changed according to the configuration of terminal device. For example, a Global Positioning System (GPS) receiver (not shown) to receive a GPS signal from GPS satellite and calculate the current location of the user terminal device 100, and a Digital Multimedia Broadcasting (DMB) receiver (not shown) to receive and process a DMB signal may be further included.

Figure 2:
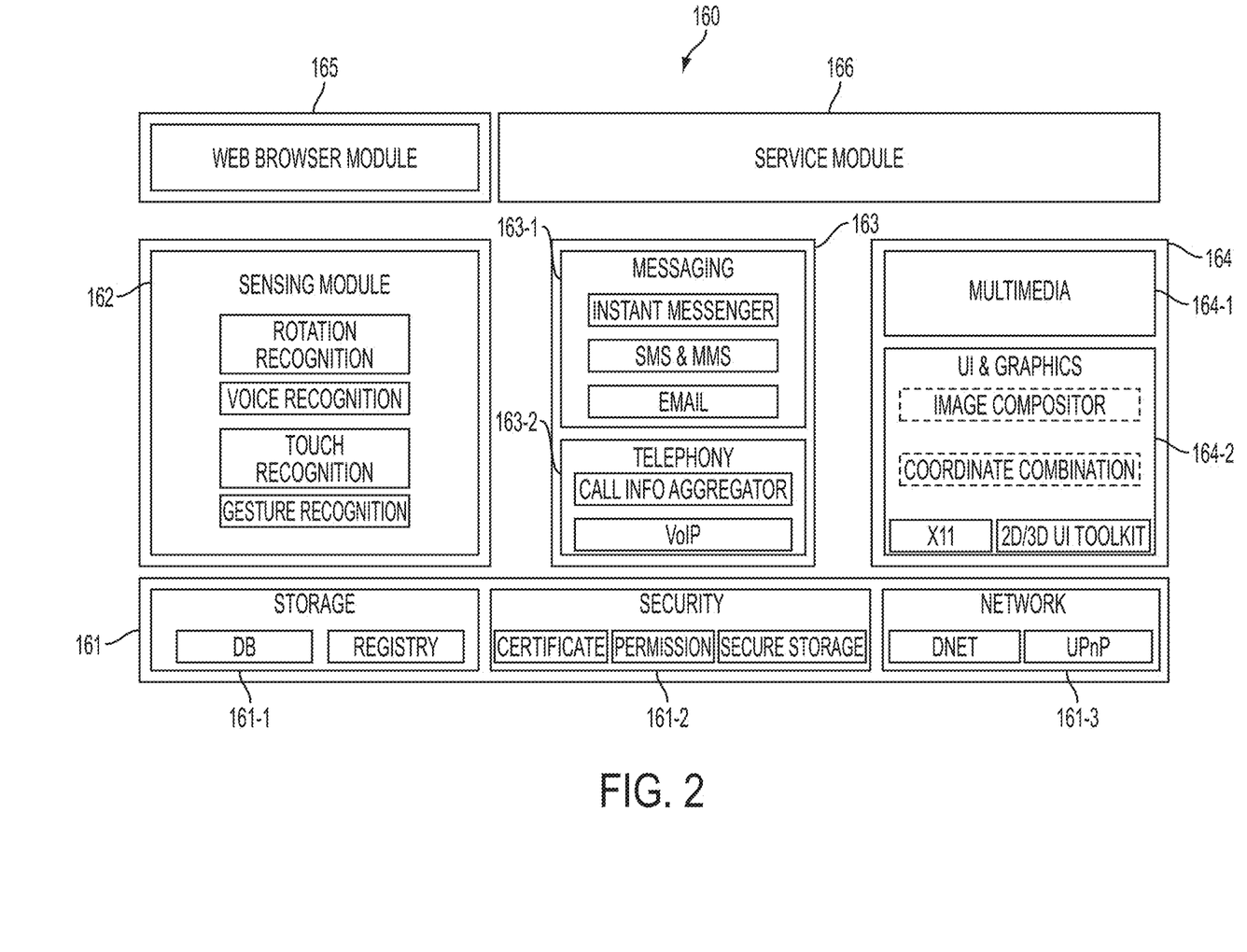
FIG. 2 illustrates a block diagram of software modules in a storage unit 160 according to various embodiments of the present disclosure.

FIG. 2 is a block diagram of software modules in a storage unit 160 according to an embodiment of the present disclosure.

Referring to FIG. 2, the storage unit 160 may store software including a base module 161, a sensing module 162, a communication module 163, a presentation module 164, a web browser module 165, and a service module 166.

The base module 161 refers to a basic module which processes a signal transmitted from hardware included in the user terminal device 100 and transmits the processed signal to an upper layer module. The base module 161 includes a storage module 161-1, a security module 161-2, and a network module 161-3. The storage module 161-1 is a program module including database or registry. The main CPU 123 may access a database in the storage unit 160 using the storage module 161-1 to read out various data. The security module 161-2 is a program module which supports certification, permission, secure storage, etc. with respect to hardware, and the network module 161-3 is a module which supports network connections, and includes a DNET module, a Universal Plug and Play (UPnP) module, and so on.

The sensing module 162 collects information from various sensors, analyzes the collected information, and manages the collected information. The sensing module 162 may include suitable modules such as a face recognition module, a voice recognition module, a touch recognition module, a motion recognition (i.e., gesture recognition) module, a rotation recognition module, and an NFC recognition module, and so forth.

The communication module 163 performs communication with other devices. The communication module 163 may include any suitable module according to the configuration of the user terminal device 100 such as a messaging module 163-1 (e.g., a messaging application), a Short Message Service (SMS) & a Multimedia Message Service (MMS) module, an e-mail module, etc., and a call module 163-2 that includes a call information aggregator program module, a VoIP module, and so forth.

The presentation module 164 composes an image to display on the display 130. The presentation module 164 includes suitable modules such as a multimedia module 164-1 and a UI rendering module 164-2. The multimedia module 164-1 may include suitable modules for generating and reproducing various multimedia contents, screens, and sounds. For example, the multimedia module 164-1 includes a player module, a camcorder module, a sound processing module, and so forth. The UI rendering module 164-2 may include an image compositor module for combining images, a coordinates combination module for combining and generating coordinates on the screen where an image is to be displayed, an X11 module for receiving various events from hardware, a 2D/3D UI toolkit for providing a tool for composing a UI in 2D or 3D form, and so forth.

The web browser module 165 accesses a web server to retrieve data and displays the retrieved data in response to a user input. The web browser module 165 may also be configured to transmit user input to the web server. The web browser module 165 may include suitable modules such as a web view module for composing a web page according to the markup language, a download agent module for downloading data, a bookmark module, a web-kit module, and so forth.

The service module 166 is a module including applications for providing various services. Specifically, the service module 166 may include program modules such as a navigation program, a content reproduction program, a game program, an electronic book program, a calendar program, an alarm management program, other widgets, and so forth.

FIG. 2 illustrates various program modules, but some of the various program modules may be omitted, changed, or added according to the configuration of the user terminal device 100. For example, a location-based module which supports a location-based service in association with hardware such as a GPS receiver may be further included. In another example, a camera 194 may not be included because the user terminal device 100 is configured for a high-security location.

Figure 3:
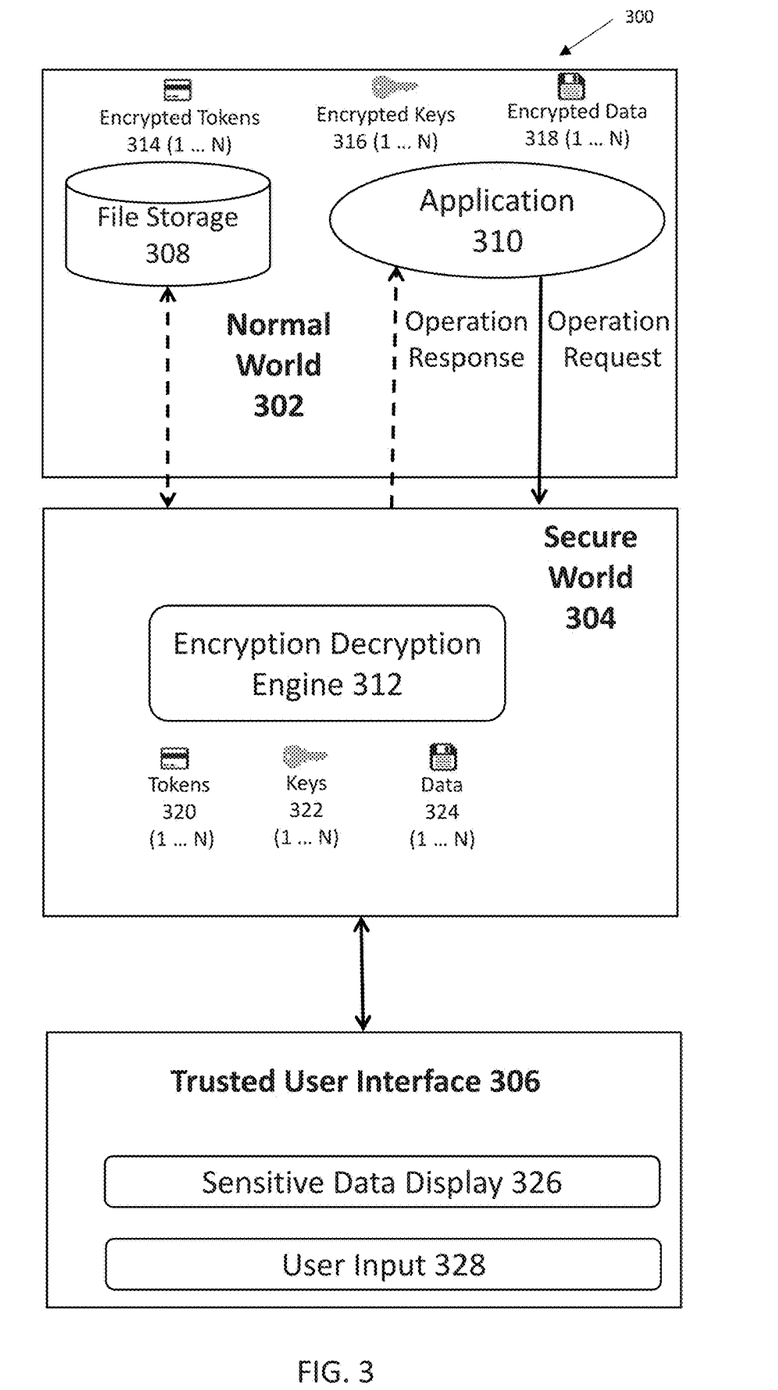
FIG. 3 illustrates a block diagram of data access operations according to various embodiments of the present disclosure.

FIG. 3 illustrates a block diagram of sensitive data access operations 300 according to various embodiments of the present disclosure. As illustrated in FIG. 3, a user device may contain a secure world or environment 304, a normal world or environment 302, and a TUI 306. In some embodiments, a TUI 306 may be a portion or component of a secure environment 304. In some, embodiments a TUI 306 may be securely interfaced with a secure environment 304 (e.g., via a secure hardware channel, via an encrypted and secure connection, etc.).

Normal environment 302 may be an operating environment used for non-sensitive or less-sensitive data and/or operations. Normal environment 302 may contain file storage 308 which may store data of different levels of security. Data of different levels of security may be stored in different manners (e.g., unencrypted, password protected, different levels of encryption, additional authentication mechanisms associated, etc.). In some embodiments, file storage 308 may separate data of different levels of security in different partitions, directories, or other logical and/or physical patterns of organization. In some embodiments, a user device may contain separate file storage accessible only by a secure environment which may be used for data storage for files of one or more levels of sensitivity. Normal environment 302 may also contain one or more applications 310.

Secure environment 304 may contain an encryption/decryption engine 312. Secure environment 304 may be a trusted execution environment (TEE) which may use a secure O/S, dedicated secure hardware, and/or other security measures (e.g., an ARM® TrustZone®).

TUI 306 may contain one or more modules or secure components such as, for example, sensitive data display component 326, and/or user input component 328. Sensitive data display component 326 may handle requests via a TUI for access to data. User input component 328 may also collect data input via TUI for creation of a file. TUI 306 may support secure applications or components. A secure component may include a secure touchpad, camera, microphone, or other sensors connected via TUI 306. User input component 328 may collect, via TUI 306, user input used for key generation (e.g., a passwords, PINs, fingerprints, biometrics, etc.).

In some embodiments, all sensitive data may be always stored encrypted (e.g., in file storage 308 or in storage of secure world 304). External communication may be secured via a TUI. As illustrated, sensitive data such as, for example, tokens, keys, certificates, and payment credentials may be stored encrypted in a normal world (e.g., encrypted tokens 314 (1 . . . N), encrypted keys 316 (1 . . . N), and encrypted data 318 (1 . . . N)). Sensitive data may only be decrypted and/or provided unencrypted in a secure environment such as a trusted execution environment (e.g., tokens 320 (1 . . . N), keys 322 (1 . . . N), and data 324 (1 . . . N)).

In one or more embodiments, no key data collection and no key generation or usage will occur in a Normal World (e.g., outside of a TEE). Hence, in these embodiments, even if the Normal World part of the device is compromised, leakage is thwarted. Even though write and read operations may be initiated by relatively insecure applications, any access of sensitive data may occur only inside secure environment 304. Additionally, other operations may be performed to further secure sensitive data (e.g., authentication of a user associated with an operation involving sensitive data and/or verification of a boot image).

In some embodiments, verification of a boot image may be performed prior to execution of any transaction operation or other operation involving sensitive data. A boot image may be verified using one or more stored indicators (e.g., hash values) of one or more portions of a system (e.g., a bootloader, kernel, etc.). For example, a hash value or other indicator may be generated by a manufacturer or other secure provider (e.g., a system build time) and the hash value may be securely stored (e.g., TEE secure memory). At boot up, one or more indicators may be generated (e.g., hash values) and may be compared against the secure stored indicators. If the generated indicators do not match the securely stored indicators, it may indicate that the system has been compromised and boot verification will fail. If boot verification fails, any request to access sensitive data will be rejected (e.g., payment operations).

If boot verification fails a secure indicator (e.g., a device warranty bit) may be set. The device warranty bit may be a fuse or other secure memory which may indicate that a device has been compromised. In some embodiments, prior to any payment transaction or other operation involving sensitive data, the device warranty bit may be checked. If the device warranty bit is set, the operation may be denied.

In some embodiments, authentication of a user associated with an access request for sensitive data (e.g., transaction credentials) may be performed by a trusted application in a TEE, such as, for example, secure world 304. This may reduce an opportunity for an attacker to generate fake authentication to trigger a payment even if normal world 302 is compromised. A trusted application running in secure world 304 may check any authentication result and ensure one or more of the following conditions are satisfied before any payment operation: 1.) The authentication is successful, 2.) The authentication result is only for a proper subset of sensitive data (e.g., a particular card network, a particular bank, a particular account, a particular transaction for a particular account, a particular amount, etc.) Authentication may allow access in secure world 304 to a sensitive data object (e.g., a key, a token, a payment credential) via encryption decryption engine 312. The sensitive data object may be specific to a particular subset of sensitive data (e.g., authentication may allow access to a key that is good only for a particular account, for a particular account for a specific transaction, etc.).

As described in further detail in reference to FIG. 6, below, authentication may be based upon user input (e.g., a finger print, a PIN, a password, other biometric-based method, etc.) which may be collected in secure environment 304 (e.g., if a TUI is part of the secure environment) or may be securely collected and passed to secure environment 304 using TUI 306.

As illustrated in FIG. 3, application 310 may send an operation request from normal environment 302 to secure environment 304. In some embodiments, a user may be notified and/or prompted for input via TUI 306. Input entered via TUI 306 may be provided to a trusted application running in secure world 304 for authentication. If a user is authenticated, encryption decryption engine 312 may provide access to sensitive data in secure world 304 so that a transaction operation may occur. Notifications (e.g., success, failure, status, etc.) may be provided as an operation response to application 310. As discussed in further detail with respect to FIG. 5 below, other measures may be taken prior to any transaction operations being performed (e.g., boot verification). Different types of sensitive data may be encrypted using different encryption keys to reduce a risk from potential key, token, or credential leakage. For example, a particular credit card account on a specific payment network (e.g., a specific bank credit card account) may be encrypted with a first key and a different credit card account with a same bank, a same payment network, and a same account holder (e.g., cardholder) may be encrypted with a different key. Different levels of encryption granularity may be used. For example, in some embodiments, a same user and a same payment network may use a same key, etc.

Furthermore, an encryption algorithm used for sensitive data may have an integrity check (e.g., a checksum or message digest). This may prevent attacker from modifying encrypted data from normal world (e.g., modifying an encrypted key). Other verification may be performed (e.g., verification of card data/stripe data, verification of digital signatures, etc.).

In some embodiments, all sensitive data I/O operations may occur in secure environment 304. Communication with a user may occur through TUI 306. Input through TUI 306 may include input entered by a user via one or more of a touch pad, a microphone, and a camera. Other input and/or sensors may be used.

In one or more embodiments, sensitive output (e.g., account information, credential information, etc.) may be displayed to authenticated users through TUI 306. Display of sensitive data via TUI 306 may prevent unsecure processes or applications running in a normal world, and unauthenticated users, from accessing sensitive data. Rendering of files for display via TUI 306 may be performed securely (e.g., via a raw frame buffer that prevents other applications or processes from gaining access to sensitive data).

In some embodiments, write and read operations may be initiated by less secure applications (e.g., applications 310) operating in a normal environment 302. In other embodiments, read/write operations may be initiated by secure applications operating via TUI 306.

Figure 4:
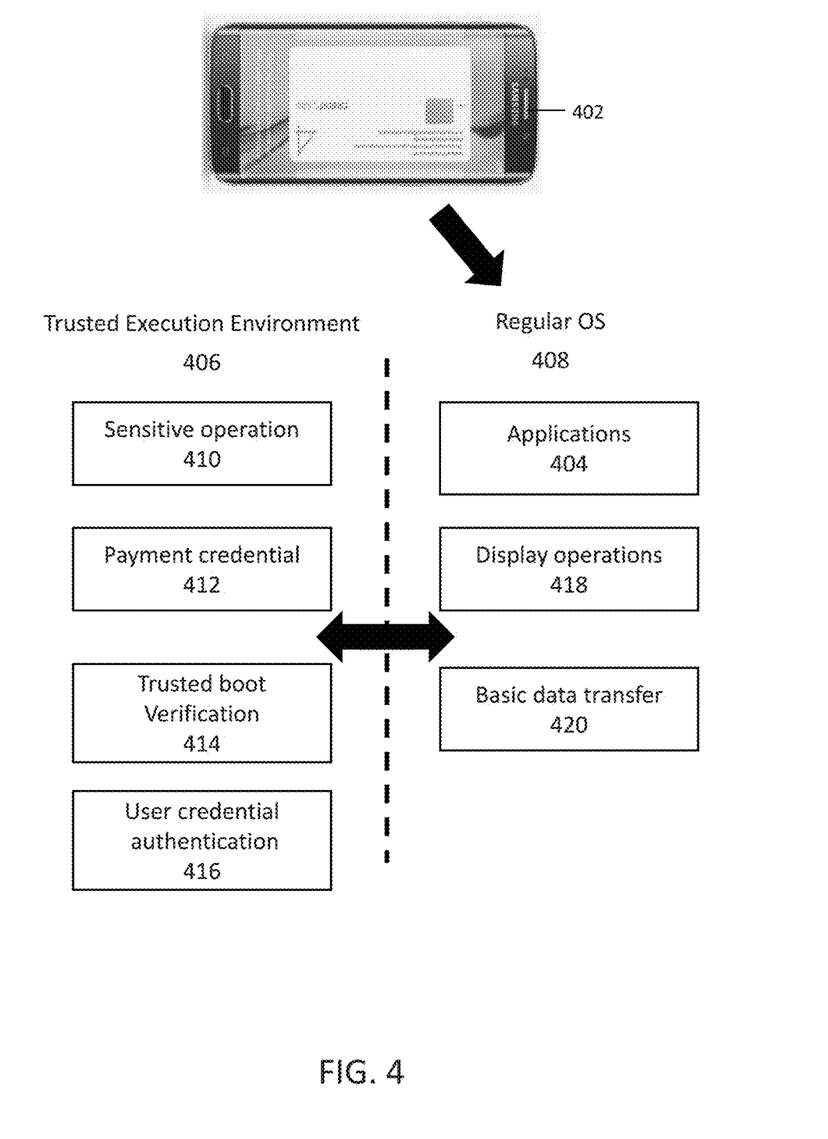
FIG. 4 illustrates a block diagram of data access operations according to various embodiments of the present disclosure.

FIG. 4 illustrates a block diagram of data access operations according to various embodiments of the present disclosure. As illustrated in FIG. 4, mobile device 402 may contain one or more applications 404. Processing performed on mobile device 402 may be divided between a TEE 406 and regular OS 408. A trusted execution environment may use a secure O/S, dedicated secure hardware, dedicated memory space, separate memory, and/or other security measures (e.g., an ARM® TrustZone®). Determination of which tasks are performed by which portion of a mobile device may, in some embodiments, be decided in TEE 406. For example, if sensitive data, transaction credentials, user authentication, boot image verification, or other sensitive operations are being performed, they may be performed in TEE 406 (e.g., sensitive operation 410, payment credential 412, trusted boot verification 414, user credential authentication 416, etc.)

For operations not involving sensitive data, the operations may be performed within regular OS 408 (display operations 418 (for non-sensitive data), basic data transfer 420, etc.). As illustrated, an operation may be initiated by an application 404, and may proceed to TEE 406 depending on the nature of the operation. Data may be exchanged between TEE 406 and regular OS 408, but sensitive data may not be provided unencrypted outside of TEE 406.

Figure 5:
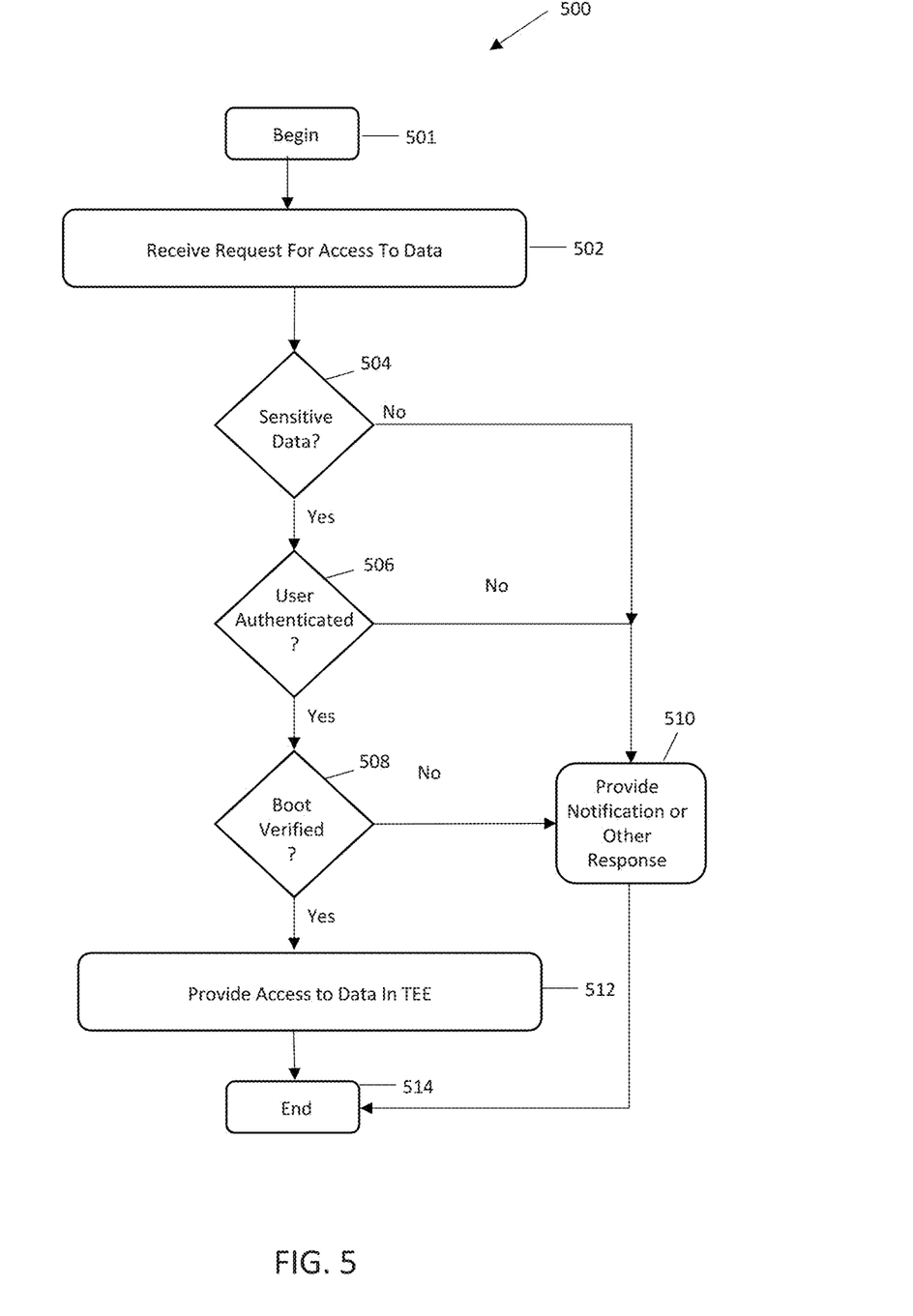
FIG. 5 is a flowchart illustrating a method of handling a request for access to sensitive data, according to various embodiments of the present disclosure.

FIG. 5 is a flowchart illustrating a method of handling a request for access to sensitive data, according to various embodiments of the present disclosure. The method 500 may begin at block 501. At block 502, a data access request may be received.

At block 504, it may be determined whether sensitive data is involved (e.g., payment credentials, keys, tokens, etc.). If the data is not sensitive, the method may continue at block 510. At block 510, access may be provided via a regular portion of an operation system (i.e., other response 510). If the requested data or operation is sensitive, the method may continue at block 506. The determination may be made by a trusted application in a TEE.

At block 506, it may be determined whether a user associated with the request for sensitive data has been authenticated. The determination may be made by a trusted application in a TEE. Authentication may be for a specific payment network, specific card account, etc. For example, a particular card network such as Amex, Visa, Mastercard, a particular bank, a particular account, a particular transaction for a particular account, etc. Different levels of encryption granularity may be used. If the user has been authenticated, the method may continue at block 508. If the user has not been authenticated, the method may continue to block 510, where another response may include a notification, a denial, etc.

At block 508, it may be determined whether a boot image has been verified. A boot image may be verified using one or more stored indicators (e.g., hash values) of one or more portions of a system (e.g., a bootloader, kernel, etc.). For example, a hash value or other indicator may be generated by a manufacturer or other secure provider (e.g., a system build time) and the hash value may be securely stored (e.g., TEE secure memory). One or more indicators may be generated from a current system image (e.g., hash values) and may be compared against the secure stored indicators. If the generated indicators do not match the securely stored indicators, it may indicate that the system has been compromised and boot verification will fail. If boot verification fails, the method may continue at block 510.

In some embodiments, the one or more indicators may be generated at boot up and compared with the securely stored indicators at boot up. In these embodiments, if a boot verification fails a secure indicator (e.g., a device warranty bit) may be set. In these embodiments, the method may check the secure indicator at block 508. If boot verification fails, the method may continue at block 510. If boot verification succeeds the method may continue at block 512.

At block 510, any request to access sensitive data will be rejected (e.g., payment operations denied). A notification and/or other security operations may be performed.

At block 512, access may be provided to sensitive data in a trusted execution environment (e.g., a transaction operation may be performed using a payment credential or token).

The method 500 may end at block 514.

Figure 6:
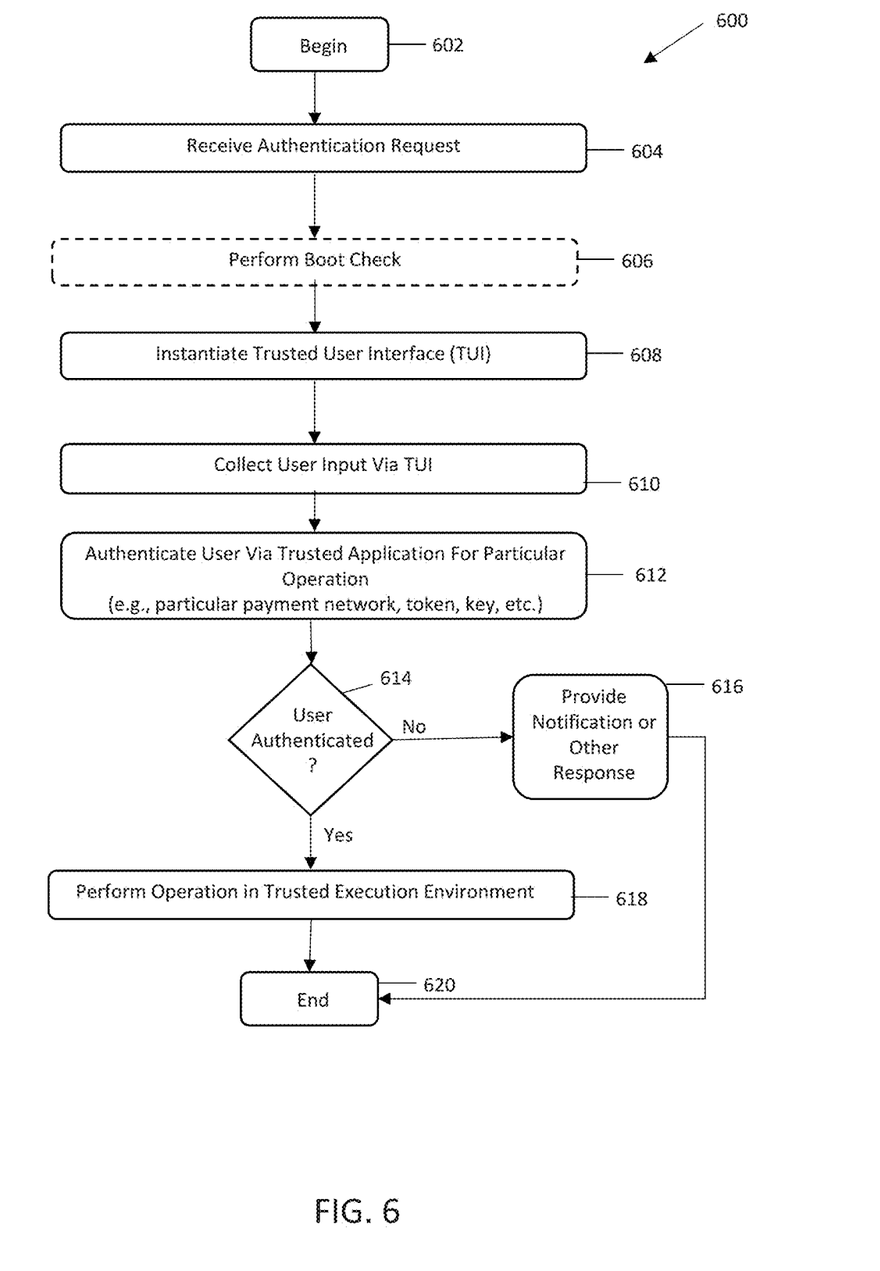
FIG. 6 is a flowchart illustrating a method of authenticating a user, according to various embodiments of the present disclosure.

FIG. 6 is a flowchart illustrating a method of authenticating a user, according to various embodiments of the present disclosure. Method 600 may begin at block 602. An authentication request may be received at block 604.

At block 606, a boot check may be performed. If verification of a boot image fails, the method 600 may terminate. If verification of a boot image succeeds, the method may continue at block 608.

At block 608, a trusted user interface may be instantiated to allow secure entry of user input. At block 610, user input may be collected (e.g., a fingerprint or other biometric identifying data, a password, a PIN, etc.). User input may be passed securely to a TEE.

At block 612, a trusted application running in a TEE may receive user input from a TUI and may authenticate a user. Authentication may be specific to a payment network, an account, a token, a key, etc.

It may be determined at block 614, whether the user was authenticated. If the user was authenticated the method 600 may proceed to block 618. If the authentication failed, the method 600 may proceed to block 616.

At block 616, a notification or other operation may be performed in response to the authentication failure. In some embodiments, security measures may include notifying a user or administrator via email or messaging, disabling future financial transactions for a specified period, scanning a device for malware, and/or requiring additional authentication input on subsequent attempts.

At block 618, an operation may be performed in a TEE based on the user's successful authentication.

At block 620 the method 600 may end.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are noted intended to limit the scope of the present disclosure. Accordingly, the scope of the present disclosure should be understood as to include any and all modifications that may be made without departing from the technical spirit of the present disclosure.

What is claimed is:

1. A method of providing a secure payment transaction on a mobile device comprising:
   determining, using a computer processor of the mobile device, whether a requested operation is a security sensitive operation; and
   when the requested operation is determined to be a security sensitive operation, determining, using the computer processor of the mobile device, whether a device warranty bit in a fuse has been set, and when the device warranty bit has not been set, executing the requested operation in a secure environment of the mobile device,
   wherein executing the requested operation in the secure environment of the mobile device comprises:
      determining whether one or more conditions are met, and
      when the one or more conditions are not met disabling financial transactions for a specified period.

2. The method of claim 1, wherein the secure environment comprises a trusted execution environment.

3. The method of claim 1, wherein, when the requested operation is determined not to be a security sensitive operation, the requested operation is executed in a portion of the mobile device outside of the secure environment.

4. The method of claim 1, wherein the determining that the requested operation is the security sensitive operation is based at least in part on a request of the requested operation to access sensitive data.

5. The method of claim 4, wherein the sensitive data comprises at least one of a key, a token, or a payment credential.

6. The method of claim 1, wherein the requested operation comprises a requested operation associated with a secure payment transaction.

7. The method of claim 1, wherein executing the requested operation in a secure environment of the mobile device comprises:
   executing the requested operation in the secure environment of the mobile device when the one or more conditions are met.

8. The method of claim 7, wherein the one or more conditions comprise an authentication of a user, performed in the secure environment, associated with a secure payment transaction.

9. The method of claim 8, wherein the authentication of the user is based at least in part on input received through a trusted user interface securely connected with the secure environment.

10. The method of claim 8, wherein the authentication of the user comprises authenticating the user for at least one of a specific payment network, a specific account, a specific key, a specific token, or a specific payment credential.

11. The method of claim 7, wherein the one or more conditions comprise verification of a boot image.

12. The method of claim 11, wherein the verification of the boot image comprises verifying a hash value associated with the boot image against a securely stored previous hash value.

13. The method of claim 11, further comprising:
determining that verification of the boot image failed, and setting the device warranty bit based on the failure determination.

14. An apparatus for securing sensitive data on a mobile device, the apparatus comprising:
a memory in a secure environment on the mobile device, the memory storing executable instructions for securing sensitive data;
a touch sensitive display for displaying a trusted user interface (TUI) on the mobile device; and
a processor in the secure environment on the mobile device, wherein the processor is configured to execute the stored instructions to:
determine whether a requested operation is a security sensitive operation; and
when the requested operation is determined to be a security sensitive operation, determine whether a device warranty bit in a fuse has been set, and when the device warranty bit has not been set, execute the requested operation in a secure environment of the mobile device,
wherein executing the requested operation in the secure environment of the mobile device comprises:
determining whether one or more conditions are met, and
when the one or more conditions are not met disabling financial transactions for a specified period.

15. The apparatus of claim 14, wherein the secure environment comprises a trusted execution environment.

16. The apparatus of claim 14, wherein, when the requested operation is determined not to be a security sensitive operation, the requested operation is executed in a portion of the mobile device outside of the secure environment.

17. The apparatus of claim 14, wherein the determining that a requested operation is a security sensitive operation is based at least in part on a request of the requested operation to access sensitive data.

18. The apparatus of claim 17, wherein the sensitive data comprises at least one of a key, a token, or a payment credential.

19. The apparatus of claim 14, wherein executing the requested operation in a secure environment of the mobile device comprises:
executing the requested operation in the secure environment of the mobile device when the one or more conditions are met.

20. The apparatus of claim 19, wherein the one or more conditions comprise an authentication of a user associated with a secure payment transaction.

21. The apparatus of claim 20, wherein the authentication of the user is based at least in part on input received through a trusted user interface securely connected with the secure environment.

22. The apparatus of claim 19, wherein the one or more conditions comprise verification of a boot image.

23. A non-transitory computer processor readable storage medium including instructions, executable by a processor, stored thereon to perform a method comprising:
determining whether a requested operation is a security sensitive operation; and
when the requested operation is determined to be a security sensitive operation, determining whether a device warranty bit in a fuse has been set, and when the device warranty bit has not been set, executing the requested operation in a secure environment of a mobile device,
wherein executing the requested operation in the secure environment of the mobile device comprises:
determining whether one or more conditions are met, and
when the one or more conditions are not met disabling financial transactions for a specified period.

* * * * *